United States Patent [19]

Kögel et al.

[11] Patent Number: 5,925,686
[45] Date of Patent: Jul. 20, 1999

[54] PRODUCTION OF EXPANDED POLYOLEFIN PARTICLES

[75] Inventors: Wolfram Kögel, Mannheim; Isidoor De Grave, Wachenheim; Klaus Hahn, Kirchheim; Joachim Fischer, Grosskarlbach, all of Germany

[73] Assignee: BASF Aktiengesellschaft, Ludwigshafen, Germany

[21] Appl. No.: 08/952,113

[22] PCT Filed: May 17, 1996

[86] PCT No.: PCT/EP96/02116

§ 371 Date: Nov. 24, 1997

§ 102(e) Date: Nov. 24, 1997

[87] PCT Pub. No.: WO96/37541

PCT Pub. Date: Nov. 28, 1996

[30] Foreign Application Priority Data

May 26, 1995 [DE] Germany .......................... 195 19 336

[51] Int. Cl.$^6$ .................................. C08J 9/10; C08J 9/18
[52] U.S. Cl. .................................. 521/60; 521/56; 521/59; 521/94
[58] Field of Search .................................. 521/56, 59, 60, 521/94

[56] References Cited

FOREIGN PATENT DOCUMENTS

| 164 855 | 12/1985 | European Pat. Off. . |
| 22 56 480 | 5/1974 | Germany . |
| 39 23 913 | 2/1991 | Germany . |

*Primary Examiner*—Morton Foelak
*Attorney, Agent, or Firm*—Oblon, Spivak, McClelland, Maier & Neustadt, P.C.

[57] ABSTRACT

Expanded polyolefin particles are produced by impregnation of polyolefin granules with a volatile blowing agent in suspension under pressure and subsequent decompression. The blowing agent used is ammonia.

4 Claims, No Drawings

PRODUCTION OF EXPANDED POLYOLEFIN PARTICLES

The invention relates to a process for producing expanded polyolefin (EPO) particles by impregnation of polyolefin granules with a volatile blowing agent in suspension under pressure at elevated temperature.

Said process is known per se and is operated on a large industrial scale. EP-A 53 333 and EP-A 123 144 disclose the use of organic compounds such as halogenated hydrocarbons, e.g. dichlorodifluoromethane, or hydrocarbons, e.g. butane, as blowing agents. However, such organic blowing agents are not unproblematical for various reasons, e.g. owing to their low environmental compatibility, their combustibility or their toxicity.

EP-A 113 903 and EP-A 168 954 therefore propose carbon dioxide as blowing agent. However, when $CO_2$ is used the process has to be carried out under relatively high pressure, which is disadvantageous in many cases.

It is an object of the present invention to provide an alternative volatile blowing agent for EPO production.

We have found that this object is achieved by using ammonia as blowing agent.

The invention accordingly provides a process for producing EPO particles by impregnation of polyolefin granules with at least 1% by weight of ammonia in suspension under pressure at elevated temperature and subsequent decompression.

DE-A 38 00 650 and 39 23 913 describe the production of foams, wherein carbon dioxide or ammonia in liquid form is injected into a molten thermoplastic, e.g. a polyolefin or polystyrene, and the melt is extruded with foaming. This process is a fundamentally different foaming process from that of the present invention. This extrusion-foaming process has the fundamental disadvantage that modified polymers have to be used (EP-A 0 588 321), the space-time yield is low and the bulk density can be varied only within a narrow range. The foam particles obtainable by the extrusion technique also have a narrow processing range and give foam moldings having an unsatisfactory mechanical property profile.

In the process of the invention, the use of ammonia in combination with other blowing agents should not be excluded. Auxiliary blowing agents which can be used are, for example, nitrogen, noble gases, carbon dioxide and, in small amounts, hydrocarbons such as propane, butanes, pentanes, heptanes, octanes, cyclopentane and cyclohexane.

For the purposes of the present invention, polyolefins are a) homopolypropylene,
b) random copolymers of propylene with from 0.1 to 15, preferably from 0.5 to 12, % by weight of ethylene and/or a $C_4$–$C_{10}$-α-olefin, preferably a copolymer of propylene with from 0.5 to 6% by weight of ethylene or with from 0.5 to 15% by weight of 1-butene or a terpolymer of propylene, from 0.5 to 6% by weight of ethylene and from 0.5 to 6% by weight of 1-butene, or
c) mixtures of a) or b) with from 0.1 to 75, preferably from 3 to 50, % by weight of a polyolefin elastomer, e.g. an ethylene/propylene block copolymer containing from 30 to 70% by weight of propylene,
d) polyethylene (LLDPE, LDPE, MDPE, HDPE) and
e) mixtures of the polyolefins specified under a) to d) (if desired after addition of compatibilizers).

The crystallite melting point (DSC maximum) of the polyolefins listed under a) to e) is generally between 90 and 170° C. Their heat of fusion, determined by the DSC method, is preferably from 20 to 300 J/g, the melt flow index MFI (230° C., 2.16 kp for propylene polymers and 190° C., 2.16 kp for ethylene polymers) in accordance with DIN 53 735 is from 0.1 to 100 g/10 min.

The production of the EPO particles starts out from polyolefin granules which preferably have a mean diameter of from 0.2 to 10 mm, in particular from 0.5 to 5 mm. In a stirred reactor, 100 parts by weight of these granules are dispersed in from 100 to 500 parts by weight of liquid, preferably water, together with from 0.1 to 10 parts by weight, preferably from 1 to 7 parts by weight, of a suspension aid. Examples of suitable suspension aids are tricalcium phosphate, calcium carbonate, siliceous earth and aluminum oxide. The suspension liquid used can also be an alcohol such as ethanol or a mixture of alcohols with water.

The blowing agent is then injected in amounts of at least 1, preferably from 2 to 50, parts by weight, in particular from 10 to 30 parts by weight, based on 100 parts by weight of polymer, and the contents of the reactor are heated.

The addition of blowing agent can be carried out before or during the heating (including hold times) of the reactor contents to the decompression temperature. This should be from 5° C. below to 20° C. above, preferably from 2 to 10° C. above, the crystallite melting point of the polyolefin. When using mixtures of ammonia and one or more other blowing agents, the impregnation temperature is, depending on the composition of the blowing agent mixture, from 20° C. below to 20° C. above the crystallite melting point of the polyolefin. In the case of the preferred polypropylene polymers, the temperature used is from 110° C. to 180° C.

Depending on the amount and type of the blowing agent and the temperature level, a pressure which is generally higher than 2 bar and generally does not exceed 100 bar is established in the reactor.

The selection of the impregnation temperature and the blowing agent enables the bulk density of the EPO particles formed to be controlled. After reaching the decompression temperature, the reactor is depressurized, with the decompression advantageously being carried out into an intermediate vessel in which a pressure of preferably from 0.5 to 5 bar prevails. The ammonia and the auxiliary blowing agents can be recovered from the intermediate vessel.

The depressurization of the reactor results in an expansion of the blowing agent-containing polyolefin granules to form EPO particles having a mean diameter of from 1 to 20 mm.

The bulk density of the EPO particles can be set within wide limits of from 10 to 300 g/l, preferably from 40 to 200 g/l. The process is particularly suitable for producing EPO particles having relatively high bulk densities between 60 and 150 g/l. The EPO particles are predominantly closed-celled and have a cell count of from 1 to 5000 cells/mm$^2$, preferably from 2 to 3000 cells/mm$^2$, in particular from 10 to 1500 cells/mm$^2$.

The EPO particles can be welded together by conventional methods using steam or hot air to give foam moldings which are used in the automobile, packaging and leisure industries.

EXAMPLES

Example 1

In a stirred reactor, 100 parts by weight of a propylene-ethylene random copolymer having an ethylene content of 2.2% by weight and 4 parts by weight of tricalcium phosphate are dispersed in 180 parts by weight of water at 45° C. The reactor is then closed and 20 parts by weight of ammonia are injected. The contents of the reactor are heated to 152° C. over a period of 50 minutes. This results in a pressure rise to about 10 bar. The contents of the reactor are then decompressed through a valve at the bottom into an intermediate vessel in which a pressure of 1.7 bar builds up. The pressure in the impregnation vessel is kept constant at 20 bar during the decompression process by further injection of nitrogen. After removal of the tricalcium phosphate and drying, the EPP particles obtained have a bulk density of 62 g/l.

Example 2

Example 1 is repeated, but the contents of the reactor are heated to 151.5° C. The bulk density of the EPP particles obtained is 74 g/l.

Example 3

Example 1 is repeated, but 2 parts by weight of ammonia are added and the contents of the reactor are heated to 154° C. The bulk density of the foam particles obtained is 295 g/l.

We claim:

1. A process for producing expanded polypropylene (EPP) particles which comprises impregnating granules in aqueous suspension of a copolymer of propylene with from 0.1 to 15% by weight of ethylene and/or a $C_4$–$C_{10}$-α-olefin with at least 1% by weight of a volatile blowing agent under pressure at from 110° C. to 180° C. and subsequently decompressing the suspension, wherein the blowing agent is ammonia or ammonia in combination with an auxiliary blowing agent.

2. A process for producing expanded EPP particles as claimed in claim 1, wherein the blowing agent is ammonia in combination with nitrogen or carbon dioxide used as auxiliary blowing agent.

3. A process according to claim 1, wherein the blowing agent is added to the aqueous suspension in amounts of 10 to 300 parts by weight per 100 parts by weight of the polymer.

4. A process according to claim 3, wherein the blowing agent is ammonia.

* * * * *